United States Patent

[11] 3,598,456

[72] Inventor Robert G. Love
 Duncan, Okla.
[21] Appl. No. 5,211
[22] Filed Jan. 23, 1970
 Division of Ser. No. 782,800, Dec. 11, 1968, Pat. No. 3,512,851.
[45] Patented Aug. 10, 1971
[73] Assignee Halliburton Company
 Duncan, Okla.

[54] MAGNETICALLY SUPPORTED ROTOR IN A CONDUIT
 4 Claims, 5 Drawing Figs.
[52] U.S. Cl. ................................................. 308/10
[51] Int. Cl. ........................................... F16c 39/06
[50] Field of Search ........................................ 308/10; 74/5

[56] References Cited
 UNITED STATES PATENTS
 2,311,382 2/1943 Hansen .......................... 308/10
 2,681,835 6/1954 Green ............................ 308/10
 3,110,481 11/1963 Kivenson ........................ 308/10
 3,155,437 11/1964 Kinsey ........................... 308/10
 3,243,238 3/1966 Lyman ........................... 308/10
 FOREIGN PATENTS
 539,409 9/1941 Great Britain ................. 308/10

Primary Examiner—D. X. Sliney
Assistant Examiner—R. S. Skudy
Attorneys—Burns, Doane, Swecker & Mathis and John H. Tregoning ABSTRACT: An elongated magnetic rotor member supported by a magnetic bearing assembly in a conduit, the rotor having opposite ends with substantially conical tips which are supported by a magnetic field associated with the ends of the rotor and with spaced magnetic stator members. Each stator member includes a generally cup-shaped jewel that may be radially adjustable with respect to the longitudinal axis of the stator member. Each jewel provides a potential bearing surface for one of the rotor tips. The magnetic fields are longitudinally oriented, and are of such polarity that the tips of the rotor are drawn, in opposite directions, toward an adjacent jewel. The cup shape of the jewels provides lateral support for the rotor tip and aids in the centering thereof.

PATENTED AUG 10 1971
3,598,456
FIG.1
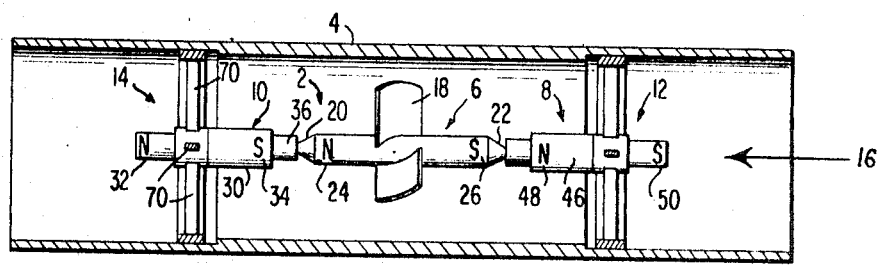
FIG.2
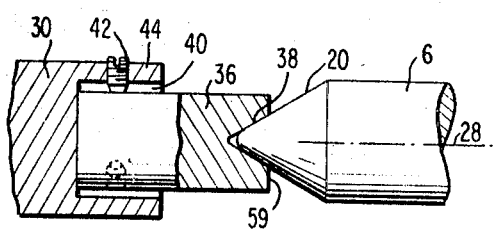
FIG.3
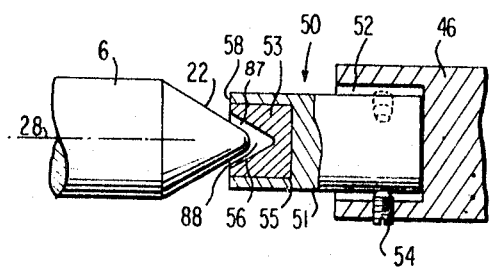
FIG.4
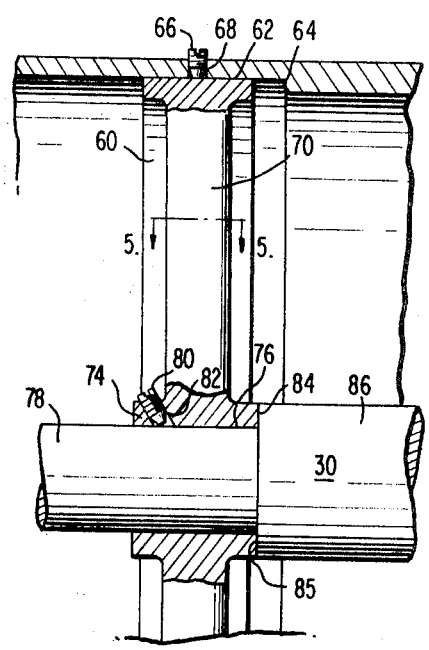
FIG.5
INVENTOR
ROBERT G. LOVE
BY Burns, Doane, Benedict,
Swecker & Mathis
ATTORNEYS

MAGNETICALLY SUPPORTED ROTOR IN A CONDUIT

This application is a division of the U.S. Pat. application, Ser. No. 782,800, of Robert G. Love, filed Dec. 11, 1968, now U.S. Pat. No. 3,512,851 and assigned to the assignee of the present application.

BACKGROUND OF THE INVENTION

This invention relates to a rotor supported in a conduit by an antifriction bearing assembly. In particular, this invention relates to supporting a magnetic or magnetizable elongated rotor member in a conduit by a magnetic antifriction bearing.

In bearing assemblies for elongated rotatable members, it has been common for many years to reduce friction by providing various types of magnetic field supports. It is usually desirable for the bearing assembly to both maintain the axis of rotation of the elongated member substantially fixed in space and constrain the member against any substantial axial displacement.

At least one prior proposed magnetic suspension seeks to obtain the desired stability by providing oppositely disposed electromagnetic fields at the ends of the elongated member, together with additional magnetic fields along the length thereof. The intensity of the field is variable, responsive to radial or axial displacement of the rotor to effect a centering thereof. While this type of magnetic support may often be adequate, it sometimes may be undesirable for a number of reasons.

For example, the provision of magnetic supports along the length of the rotatable member may undesirably increase the bulk of the suspension system as well as interfere with the efficient operation of elements to be attached to the rotatable member, such as those employed in a meter assembly.

There have also been prior proposed magnetic bearing supports that provide no magnetic field along the length of the rotatable member and include only permanent magnetic supports at one or both ends. At least one prior proposed device of this type includes an elongated rotatable member having spherical magnetic ends supported between fixed spherical magnetic members. The spherical shaft ends are oppositely attracted by the fixed spherical members.

Antifriction bearings of this latter type make no provision for lateral support of the spherical shaft ends. Therefore, forces generally transverse to the rotation axis of the rotatable member, in an amount sufficient to overcome the magnetic attraction force, will result in displacement of the axis of rotation from its most desirable constant position. Furthermore, there is no provision for minimizing wear that will occur from contact between the magnetic spheres.

It would be highly desirable to provide a low-wear, antifriction bearing that would magnetically support a rotatable shaft at both ends, for rotation about a relatively stable axis, even in the presence of generally transverse forces.

To this end, the present invention employs the combination of a magnetic field and low-friction jewel bearing supports, arranged in a manner hereinafter more fully described.

Although prior proposed bearings have included both jewel supports and magnetic supports, the minimization of wear on both ends of the rotatable member has not always been adequate. One known prior bearing assembly includes a jewel bearing support at one end of an elongated shaft, and proposes to reduce wear on the jewel bearing by providing a magnetic attracting force on the other end of the rotatable member. However, the end provided with the magnetic support, may be subject to undue wear from contact between the stator and rotor magnets, or between the rotor magnets and lateral support walls surrounding it.

Another prior assembly includes jewel bearings at two ends of a rotatable shaft which has a central disc that is magnetically repelled in opposite directions. This arrangement may not be satisfactory since the magnetic couple created by the repulsive forces may result in flipping the rotor about its axis when transverse forces are present, or may result in an increased load on the sides of the jewel. Therefore, in this assembly, conventional bearings are necessarily placed adjacent the end to prevent lateral shifting of the rotor due to transverse forces thereon.

SUMMARY OF THE INVENTION

It is, therefore, a general object of the invention to provide a magnetic bearing assembly intended to obviate or minimize the disadvantages of the sort previously noted in connection with a rotor positioned in a conduit.

It is a particular object of the invention to provide a magnetic bearing assembly for elongated rotatable members in a conduit wherein the rotor is magnetically supported at both ends, in such a way as to provide sufficient low-friction lateral support for the rotatable member without necessitating magnetic fields along its length.

It is another object of the invention to provide a5 improved magnetic bearing assembly in combination with a rotor positioned in a conduit.

It is a further object of the invention to provide a magnetic bearing assembly for an elongated rotatable member positioned in a conduit wherein the ends of the member are oppositely attracted by magnetic fields toward jewel bearing supports.

It is a still further object of the invention to provide an antifriction bearing employing jewel supports, wherein undue loading of the supports is substantially minimized through the use of magnetic fields, while danger of flipping of the elongated rotating member in the conduit is also reduced.

A preferred embodiment of the invention, intended to accomplish at least some of the foregoing objects, comprises an elongated rotatable member having opposite ends that are substantially conically shaped. The rotatable member, or rotor, is supported in a conduit at its opposite ends by means of stator magnets that induce oppositely directed attractive magnetic fields on the rotatable member. Each stator member attracts the rotor member away from the other stator member toward a jewel bearing mounted on the ends of the stator. These jewel bearings have an inverted cup shape for complementary engagement with the substantially conical tips of the stator.

In order to accommodate for various conditions of external forces that may displace the rotor axis radially, the jewel bearings may be adjustably mounted for radial movement in the stator magnets.

THE DRAWINGS

A magnetic bearing assembly constructed in accordance with a preferred embodiment of the invention is illustrated in the accompanying drawings in which:

FIG. 1 is a side elevational view of the bearing assembly as employed in a fluid flowmeter, with the fluid flow conduit and the bearing mounted structure in cross section;

FIG. 2 is an enlarged, partial cross-sectional view of the support for one end of the rotatable shaft;

FIG. 3 is an enlarged partial cross-sectional view of the support for the other end of the rotatable shaft;

FIG. 4 is an enlarged partial cross-sectional view of the mounting for one of the stator magnets of the present invention; and FIG. 5 is a cross-sectional view of a spider arm shown in FIG. 4, taken along line 5–5 therein.

DETAILED DESCRIPTION

The Bearing Assembly

Referring to FIG. 1 of the drawings, a magnetic bearing assembly 2 according to the preferred embodiment of the invention is shown mounted in a fluid flowmeter conduit 4.

The bearing assembly includes an elongated magnetic shaft 6 rotatably mounted between aligned magnetic stator supports 8 and 10. These stator supports 8 and 10 are fixed in the tubular conduit 4 by means of spider mountings 12 and 14.

Fluid flowing in the direction of the arrow 16 (FIG. 1) into the tubular conduit 4 results in rotation of the shaft 6 in response to rotation of a suitable metering blade assembly, such as an axial flow turbine blade 18 fixed to the shaft approximately midway thereof. This metering blade assembly may be of the type including magnetic slugs embedded in the rotor blade tip, and the magnetic slugs may cooperate with a magnetic digital pickoff.

The elongated shaft 6 includes opposite tips 20 and 22 having substantially conical configurations. In the illustrated embodiment the rotor 6 including the tips 20 and 22 is an integral permanent magnet made from any suitable material, for example, Alnico V. Alternatively, in order to minimize breakage of the tips due to lateral loading, the tips may be made from a suitably strong, magnetically permeable material, and may be bonded to a permanently magnetic rotor body. To this end, resin-bonded carbide tips would suffice. In either case, the opposite ends 24 and 26 of the member 6 are of opposite polarity as indicated by N and S.

The conical tips 20 and 22 cooperate with the substantially identical but mirror-image-disposed stator assemblies 8 and 10 to insure that the longitudinal axis 28 of the rotor remains substantially fixed in space during rotor movement. Furthermore, it is believed that the conical tip 22 and the space defined by the hereinafter described cup surface 56, may provide a means for generating a low-pressure zone between that tip and its adjacent stator support in order to resist longitudinal movement of the rotor 6 in the direction of fluid flow 16.

The stator assembly 10 includes an elongated permanent magnet 30 that is longitudinally aligned with the rotor magnet 6. The opposite ends 32 and 34 of the magnet are of opposite polarity as indicated by N and S. The S-pole of the stator magnet 30 is adjacent the N-pole of the rotor magnet 6 so as to induce a generally longitudinal magnetic field that attracts the conical tip 20 toward the stator 30.

A sapphire or other low-friction and magnetically permeable jewel bearing 36 is disposed at the end of the stator magnet adjacent the rotor magnet. This jewel bearing is provided with an inverted cup-shaped face 38 adapted to mate with the conical tip 20. As illustrated, the inverted cup-shaped face 38 has a substantially conical configuration that is substantially identical to the configuration of the tip 20. However, the taper of the conical face 38 may be slightly less steep than the taper of the tip 20 so that a minimal amount of play of the tip 20 in the cup is permitted.

The jewel bearing 36 is substantially cylindrical and may be adjustably mounted in a larger and generally cylindrical pocket 40 at the end of the stator magnet which faces the rotor. At least three circumferentially and generally symmetrically spaced screws 42 are threadedly mounted in the outer periphery 44 of the stator 30 so as to radially extend into the pocket 40 and into engagement with the jewel bearing 36. These screws 42 provide for radial adjustment of the jewel bearing 36 in all radial directions.

The stator assembly 8 includes a second elongated permanent magnet 46 mounted in longitudinal alignment with the rotor 6. The opposite ends 48 and 50 of the stator 46 are of opposite polarity with the N-pole being adjacent the S-pole of the rotor. A jewel bearing assembly 50 is adjustably mounted in the stator pocket 52 by means of the adjusting screws 54 in the manner previously described for the mounting of member 36.

This bearing assembly 50, as illustrated, includes a cylindrical body member 51 of a suitable magnetically permeable material that is strong in shear. A sapphire, or other low-friction and magnetically permeable jewel insert 53 is press fitted or otherwise mounted in an outwardly facing pocket 55 in the body 51. This jewel 53 presents an inverted cup-shaped bearing surface 56 to the stator tip 22. The surface 56 is substantially identical to the surface 38.

It will be appreciated that with a jewel insert 53, rather than an entire jewel body, the jewel bearing assembly 50 will provide a greater resistance to lateral loading of the rotor 6. However, depending upon the expected lateral load, the jewel bearings associated with the stators 8 and 10 may be either of the jewel insert or integral jewel body types.

In the preferred and illustrated embodiment the distance between bearing surfaces 38 and 56 is slightly greater than the length of the rotor magnet. This separation distance should be great enough so that the tips 20 and 22 cannot both be in full complementary mating engagement with the bearing surfaces at the same time, but sufficiently small so that both tips always extend beyond the outer faces 58 and 59 of the jewel bearings into the space between the conical walls of the inverted cup bearing surfaces 38 and 56.

With this arrangement the inverted cup surfaces 38 and 56 always provide potential lateral support for the tips 20 and 22 in the event the rotor 6 is acted upon by forces transverse to the axis 28. Furthermore, the bearing surfaces 38 and 56 tend to center the rotor by complementary engagement with the tips 20 and 22 if the rotor moves axially.

It will be appreciated that even if the end faces 58 and 59 are spaced by a greater distance than the length of the rotor 6, the shaft will be centered to a degree of the longitudinally oriented, oppositely attractive magnetic fields.

The Bearing Assembly Support

As previously mentioned, the stator assemblies 8 and 10 are supported in the tubular conduit 4 by means of spider assemblies 12 and 14, only one of which will be described.

The spider assembly 14 includes an outer annular ring 60 in circumferential engagement with the inner surface 62 of the conduit wall (FIG. 4). This ring may be longitudinally adjusted in the conduit along the surface 62. A radially inwardly extending shoulder 64 in the conduit wall may be provided to limit the possible longitudinally inward movement of the ring 60. A plurality of circumferentially spaced adjusting screws 66 extend radially through radial slots 68 in the conduit wall to frictionally maintain the ring 60 in its desired longitudinal position.

Extending radially inwardly from the ring 60 are a plurality of circumferentially spaced spider arms 70 having generally elliptical cross sections as indicated at 72 (FIG. 5). The arms 70 terminate at their radially innermost ends in an annular web section 74. The web section 74 defines an aperture 76 generally coaxially aligned with the ring 60 and the conduit 4.

Slidably mounted in the aperture 76 is a section 78 of the stator member 30 that is reduced in cross section and has a diameter substantially equal to that of the aperture 76. This section 78 is frictionally retained in the aperture 76 by means of one or more adjusting screws 80. The screws 80 extend through generally radially extending but inclined web section slots 82 into engagement with the periphery of the section 78. Longitudinal adjustment of the stator member 30 in the spider mounting is thereby permitted.

The outward longitudinal movement of the stator may be limited by engagement of an annular shoulder 84 of the rotor 30 with the inner faces 85 of the web section 74. This shoulder 84 is defined by the change in cross section between the reduced and enlarged section 78 and 86 of the rotor 30.

OPERATION AND METHOD OF ASSEMBLY

The assembly and operation of the magnetic bearing is described as used in a fluid flowmeter.

To assemble the bearing unit of the present invention in a fluid flowmeter, the stator magnets may be first positioned in the web section openings 76 of the spider assemblies 12 and 14 and secured therein by means of the adjusting screws 80.

One spider assembly is then inserted into the conduit section and secured in longitudinal position by means of the adjusting screws 66. The elongated rotor member 6 may be placed into the other end of the conduit assembly with, for example, its north pole tip facing to the south pole tip of stator magnet 30 and in engagement with the inverted cup bearing surface 38.

The other spider assembly is then inserted into the conduit assembly, and the tip 22 of the rotor is lifted into axial alignment with the stator 8. The spider assemblies and the stator magnets are then longitudinally adjusted to provide the desired spacing of the jewel end faces 58 and 59.

The jewel bearings 36 and 50 may be adjusted to desired radial positions.

With the previously described spacing of the end faces 58 and 59 and with equal and oppositely attractive longitudinal magnetic fields, the rotor 6 could theoretically be positioned so that both conical tips 20 and 22 are completely magnetically supported and have no physical engagement with the potential bearing surfaces 38 and 56.

However, fluid travelling in the direction of arrow 16 (FIG. 1) exerts a generally longitudinal force on the rotor member by acting on the turbine blade 18. This longitudinal force tends to urge the conical tip 30 downstream into engagement with the cup-shaped bearing surface 38 (FIG. 2). Excess wear between the rotating tip 20 and the surface 38 is minimized by at least one, and possibly two forces resisting the downstream movement.

The first of these is provided by the attractive force on the opposite tip 22 which tends to draw the member 6 away from the stator 30. The second force is believed to be inherent in the disclosed preferred embodiment and may be provided by the entering fluid as it cooperates with the conical tip 22 and a potential diverging annular flow path 87 defined between the lateral periphery of the tip and the lateral periphery of the bearing surface 56 in the space upstream of the face 58. This fluid engages the tapered surface of the tip and may create a pumping action tending to flush any fluid that may be located between the tip and the inverted cup defined by the bearing surface 56, so that this pumped fluid may exit through the path 87. Thus, a low-pressure zone 88 could be immediately generated upstream of the tip between the terminal portion of the tip and the bottom of the bearing surface 56. This low-pressure zone might create a pressure differential on the rotor causing it to tend to move upstream against the downstream force of the fluid on the rotor blade 18, and against any increased downstream magnetic attractive force that may be created by closing the gap between the downstream tip 20 and its adjacent stator 30 as a result of initial downstream movement of the rotor. Therefore, only light engagement between the tip 20 and the surface 38 is present as a possible result of the two resisting forces, and the tip 22 is entirely supported by a magnetic field.

If the magnets are of equal strength, the magnetic force exerted by the stator magnet 30 and the longitudinal force provided by the fluid may not be completely resisted by the magnetic force provided by the stator 46 or by the seemingly inherent pressure differential force due to the low pressure zone 88, since the strength of the first magnetic field is increased by motion of the stator toward the rotor 30 and the strength of the second magnetic field is decreased. Nevertheless, the jewel bearing 36 presents a low friction bearing surface 38 to the tip 20. Furthermore, the magnet 46 may, if desired, be made stronger than the magnet 30.

The possibility of flipping of the rotor 6 about its axis 28 or the possibility of excess lateral loading of the jewel bearings is prevented due to the use of the oppositely attractive forces. Furthermore, any lateral contact between the tips and the jewels resulting from transverse forces is alleviated as soon as the transverse force is removed due to the magnetic centering forces. Although the rotor 6 and stators 30 and 46 have been described as permanently magnetic, electromagnets or magnetic inserts for the rotor and stators may be employed while retaining certain advantages of the invention. Furthermore, the rotor may be magnetizable rather than permanently magnetic so long as the opposite ends are oppositely poled to retain other advantages of the invention.

Also, the cup-shaped jewel bearing surfaces may be provided in the rotor ends, while the stators are provided with mating conical tips.

SUMMARY OF ADVANTAGES

It will be seen that following the present invention, a magnetic bearing assembly supporting an elongated rotatable member in a conduit for low-frictional rotation about a stable longitudinal axis is provided.

Of particular significance is the provision of lateral support for the ends of the rotor by means of inverted cup-shaped jewel bearing surfaces that tend to center the rotor.

Also of importance in this connection is the provision for adjustability of the jewel bearings to accommodate for variations in desired axial alignment.

Other advantages may be provided when the stator magnets exert oppositely attractive forces on the rotor magnet to thereby minimize the possibility of flipping of the rotor due to transverse external forces.

Furthermore, magnetic support of the rotor member is obtainable without the need for magnet fields imposed on the length thereof and the use of oppositely attractive magnetic fields provides for centering of the rotor and tends to reduce rather than magnify longitudinal or transverse load on the jewel bearings.

Although the invention has been described with reference to the embodiment illustrated, it will be appreciated by those skilled in the art that additions, modifications, substitutions, deletions, and other changes not specifically described may be made which fall within the spirit of the invention as defined in the following claims.

What I claim is:
1. A device comprising:
   a conduit;
   a rotor positioned within said conduit, having
      a magnetic axle having two ends of opposite polarity, and
      a plurality of rotor blades extending radically therefrom;
      a first combination jewel and magnetic bearing means for supporting one end of said rotor axle within said conduit, said jewel means presenting a first potential bearing surface facing said one end of said axle, and said magnetic means inducing a first generally longitudinally oriented magnetic field to attract said one end of said axle toward said first potential bearing surface; and
      a second combination jewel and magnetic bearing means for supporting the other end of said rotor axis within said conduit, said jewel means presenting a second potential bearing surface facing said other end of said axle, and said magnetic means inducing a second generally longitudinally oriented magnetic field to attract said other end of said axle toward said second potential bearing surface, whereby said rotor may be supported within said conduit for rotation with a minimum amount of bearing frictional drag.
2. A device as defined in claim 1 wherein:
   said first and second combination jewels and magnetic bearing means is supported by a first and second stator vane assembly, each assembly having
      a web portion for carrying said bearing means,
      radially extending arms, and
      a ring for engagement with the inner surface of said conduit.
3. A device as defined in claim 1 wherein said first and second combination magnetic and jewel bearing means each comprises:
   a permanent magnet, and
   a jewel bearing axially aligned therewith.
4. A device as defined in claim 3 and further comprising:
   adjustment means for radially and axially adjusting said jewel with respect to said magnet.